United States Patent
Hensley

(10) Patent No.: US 11,677,724 B1
(45) Date of Patent: *Jun. 13, 2023

(54) DATA ACCESS AND FIREWALL TUNNELING USING A CUSTOM SOCKET FACTORY

(71) Applicant: Progress Software Corporation, Burlington, MA (US)

(72) Inventor: John Alan Hensley, Raleigh, NC (US)

(73) Assignee: Progress Software Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,675

(22) Filed: Apr. 11, 2022

Related U.S. Application Data

(63) Continuation of application No. 16/824,343, filed on Mar. 19, 2020, now Pat. No. 11,303,613, which is a continuation of application No. 15/828,003, filed on Nov. 30, 2017, now Pat. No. 10,616,182.

(51) Int. Cl.
*H04L 9/40* (2022.01)
*H04L 61/2592* (2022.01)
*H04L 43/10* (2022.01)
*H04L 67/01* (2022.01)
*H04L 67/55* (2022.01)

(52) U.S. Cl.
CPC ........ *H04L 63/029* (2013.01); *H04L 61/2592* (2013.01); *H04L 43/10* (2013.01); *H04L 67/01* (2022.05); *H04L 67/55* (2022.05)

(58) Field of Classification Search
CPC ... H04L 63/029; H04L 61/2592; H04L 43/10; H04L 67/01; H04L 67/55
See application file for complete search history.

(56) References Cited

U.S. PATENT DOCUMENTS

| | | | |
|---|---|---|---|
| 6,081,900 | A | 6/2000 | Subramaniam et al. |
| 6,233,688 | B1 | 5/2001 | Montenegro |
| 7,010,702 | B1 | 3/2006 | Bots et al. |
| 7,231,664 | B2 | 6/2007 | Markham |
| 7,269,848 | B2 | 9/2007 | Seshadri |

(Continued)

FOREIGN PATENT DOCUMENTS

EP    2819363 A1    12/2014

OTHER PUBLICATIONS

"User Datagram Protocol." Wikipedia. Wikimedia Foundation. Jan. 23, 2015. Web. Feb. 16, 2015. 6 pages. Downloaded from http://en.wikipedia.org/wiki/User_Datagram_Protocol.

(Continued)

*Primary Examiner* — Nelson S. Giddins
(74) *Attorney, Agent, or Firm* — Patent Law Works LLP

(57) ABSTRACT

A method of tunneling through a network separation device such as a firewall or a Network Address Translator comprising establishing via a custom socket factory coupled with a host device, a connection with a cloud server by tunneling through a network separation device; maintaining, via the custom socket factory, the connection with the cloud server through the network separation device; receiving, via the connection between the custom socket factory and the cloud server, connection information; and directly connecting, via the custom socket factory, to a client device using the connection information received from the cloud server.

20 Claims, 4 Drawing Sheets

(56) References Cited

U.S. PATENT DOCUMENTS

| | | |
|---|---|---|
| 7,480,065 B1 | 1/2009 | Trandal et al. |
| 7,509,492 B2 | 3/2009 | Boyen et al. |
| 7,617,527 B2 | 11/2009 | Bots et al. |
| 7,688,981 B2 | 3/2010 | Halasz et al. |
| 7,748,045 B2 | 6/2010 | Kenrich et al. |
| 8,085,746 B2 | 12/2011 | Kiss et al. |
| 8,447,871 B1 | 5/2013 | Szabo |
| 9,390,298 B2 | 7/2016 | Nguyen |
| 9,473,506 B1 | 10/2016 | Hensley et al. |
| 9,531,678 B1 | 12/2016 | Hensley et al. |
| 9,680,795 B2 | 6/2017 | Buruganahalli et al. |
| 10,372,929 B1 | 8/2019 | Hensley et al. |
| 2001/0056505 A1* | 12/2001 | Alibakhsh .............. H04L 69/162 719/310 |
| 2002/0169980 A1 | 11/2002 | Brownell |
| 2004/0107342 A1 | 6/2004 | Pham et al. |
| 2005/0071657 A1 | 3/2005 | Ryan |
| 2005/0071658 A1 | 3/2005 | Nath et al. |
| 2005/0086289 A1 | 4/2005 | Rosenberg et al. |
| 2005/0226257 A1 | 10/2005 | Mirzabegian et al. |
| 2006/0050700 A1 | 3/2006 | Ravikumar et al. |
| 2007/0208744 A1 | 9/2007 | Krishnaprasad et al. |
| 2008/0046984 A1 | 2/2008 | Bohmer et al. |
| 2008/0133915 A1 | 6/2008 | Tanaka et al. |
| 2008/0282081 A1 | 11/2008 | Patiejunas |
| 2009/0049200 A1 | 2/2009 | Lin et al. |
| 2009/0064208 A1 | 3/2009 | Elrod |
| 2009/0125627 A1 | 5/2009 | Ford |
| 2010/0011091 A1 | 1/2010 | Carver et al. |
| 2010/0192210 A1 | 7/2010 | Purdy, Sr. et al. |
| 2010/0242096 A1 | 9/2010 | Varadharajan et al. |
| 2010/0257372 A1 | 10/2010 | Seifert |
| 2010/0313009 A1 | 12/2010 | Combet et al. |
| 2011/0153822 A1 | 6/2011 | Rajan et al. |
| 2011/0246550 A1 | 10/2011 | Levari et al. |
| 2012/0011067 A1 | 1/2012 | Katzin et al. |
| 2012/0072548 A1* | 3/2012 | Kim ....................... H04L 67/02 709/219 |
| 2012/0072713 A1 | 3/2012 | Begum et al. |
| 2012/0131663 A1 | 5/2012 | Anchan |
| 2012/0179905 A1 | 7/2012 | Ackerly |
| 2012/0188928 A1 | 7/2012 | Wang et al. |
| 2012/0233478 A1 | 9/2012 | Mucignat et al. |
| 2013/0117461 A1 | 5/2013 | Hsu et al. |
| 2013/0219468 A1 | 8/2013 | Bell |
| 2014/0372508 A1 | 12/2014 | Fausak et al. |
| 2015/0026460 A1 | 1/2015 | Walton et al. |
| 2015/0026474 A1 | 1/2015 | Irvine |
| 2015/0052373 A1 | 2/2015 | Gatta et al. |
| 2015/0074794 A1* | 3/2015 | Chuang ................ H04L 63/029 726/15 |
| 2015/0215185 A1 | 7/2015 | Thaler et al. |
| 2015/0341443 A1 | 11/2015 | Shen et al. |

OTHER PUBLICATIONS

Zink, et al., P2P-RMI : Transparent Distribution of Remote Java Objects, Sep. 2012, International Journal of :; Computer Networks Communications. 4(5), pp. 17-34. (Year: 2012).

* cited by examiner

DATA ACCESS AND FIREWALL TUNNELING USING A CUSTOM SOCKET FACTORY

CROSS-REFERENCE TO RELATED APPLICATIONS

This application is a continuation of U.S. patent application Ser. No. 16/824,343, filed Mar. 19, 2020, titled "Data Access and Firewall Tunneling Using a Custom Socket Factory," which is a continuation of and claims priority to U.S. patent application Ser. No. 15/828,003, filed Nov. 30, 2017, titled "Data Access and Firewall Tunneling Using a Custom Socket Factory," the entirety of which is hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to accessing data behind a network separation device (e.g, a firewall and/or network address translator (NAT)).

BACKGROUND

Existing solutions that allow access to data behind a network separation device require running intermediate software on a local network to establish a socket connection to a host server with data behind the network separation device and then an additional socket connection is required to connect to the client. The intermediate software then needs to transfer data between the two socket connections. This solution requires that the host server open a listener socket on a specific port and then wait for a client to connect to the listener socket. To allow the connections at the listener socket, the host server must open the specified port in the firewall to allow incoming connections to the listener socket. By opening the specified port to the listener socket, security issues arise because the port is opened for incoming connections.

A need exists for allowing access behind a network separation device without opening the network separation device for outside connections.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of connecting a host device to a client device through a network separation device including: establishing, via a custom socket factory coupled with a host device, a connection with a cloud server by tunneling through a network separation device; maintaining, via the custom socket factory, the connection with the cloud server through the network separation device; receiving, via the connection between the custom socket factory and the cloud server, connection information; and directly connecting, via the custom socket factory, to a client device using the connection information received from the cloud server. Other embodiments of this aspect include corresponding computer systems, apparatus, and computer programs recorded on one or more computer storage devices, each configured to perform the actions of the methods.

Implementations may include one or more of the following features. The method where the custom socket factory lacks a listener port and includes an interface that appears to other devices like a default socket factory interface. The method where the connection information is received responsive to the cloud server receiving a request from the client device. The method where maintaining the connection with the cloud server through the network separation device further includes performing one of a push action and a long polling action. The method where directly connecting to the client device using the connection information further includes: causing the custom socket factory to open a new socket connection to the client linking the host device to the client device through the network separation device. The method where the new socket connection is a client socket connection. The method where the custom socket factory implements an accept method to return the new socket connection to the host device. The method where the connection information is received responsive to the cloud server signaling to the custom socket factory that a connection is requested. The method where the connection information includes address information of the client device. The method where the host device is behind the network separation device and the network separation device is one of a firewall and a network address translator. Implementations of the described techniques may include hardware, a method or process, or computer software on a computer-accessible medium.

One general aspect includes a system for tunneling through a network separation device including: a custom socket factory coupled to a host device behind a network separation device, where the custom socket factory is configured to: establish a connection to a cloud server through the network separation device, detect a signal from a cloud server that a client device has requested access to the host device, receive connection information from the cloud server, open a direct connection between the host device and the client device through the network separation device using the connection information. Other embodiments of this aspect include corresponding computer systems, apparatus, and computer programs recorded on one or more computer storage devices, each configured to perform the actions of the methods.

Implementations may include one or more of the following features. The system further including: a cloud server configured to: receive a request from the client device to connect to the host device; and provide a signal to the custom socket factory that the client device has requested to connect to the host device. The system where the custom socket factory lacks a listener port and includes an interface that appears to other devices like a default socket factory interface. The system where the custom socket factory detects a signal from a cloud server by performing one of a push action and a long polling action. The system where the custom socket factory opens the direct connection between the host device and the client device by opening a new socket connection to the client device. The system where the custom socket factory implements an accept method to return the new socket connection to the host device. The system where the connection information includes address information of the client device. The system where the network separation device is one of a firewall and a network address translator. Implementations of the described techniques may include hardware, a method or process, or computer software on a computer-accessible medium.

One general aspect includes a method of tunneling through a network separation device including: establishing, via a custom socket factory coupled with a host device behind a network separation device, a connection to a cloud server through the network separation device; detecting a signal from a cloud server that a client device has requested access to the host device by long polling the cloud server using the connection; receiving connection information from the cloud server responsive to detecting the signal from the cloud server; and opening a direct connection between the host device and the client device through the network separation device by using the connection information to open a new socket connector. Other embodiments of this aspect include corresponding computer systems, apparatus, and computer programs recorded on one or more computer storage devices, each configured to perform the actions of the methods.

Implementations may include one or more of the following features. The method where the custom socket factory lacks a listener port and includes an interface that appears to other devices like a default socket factory interface. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
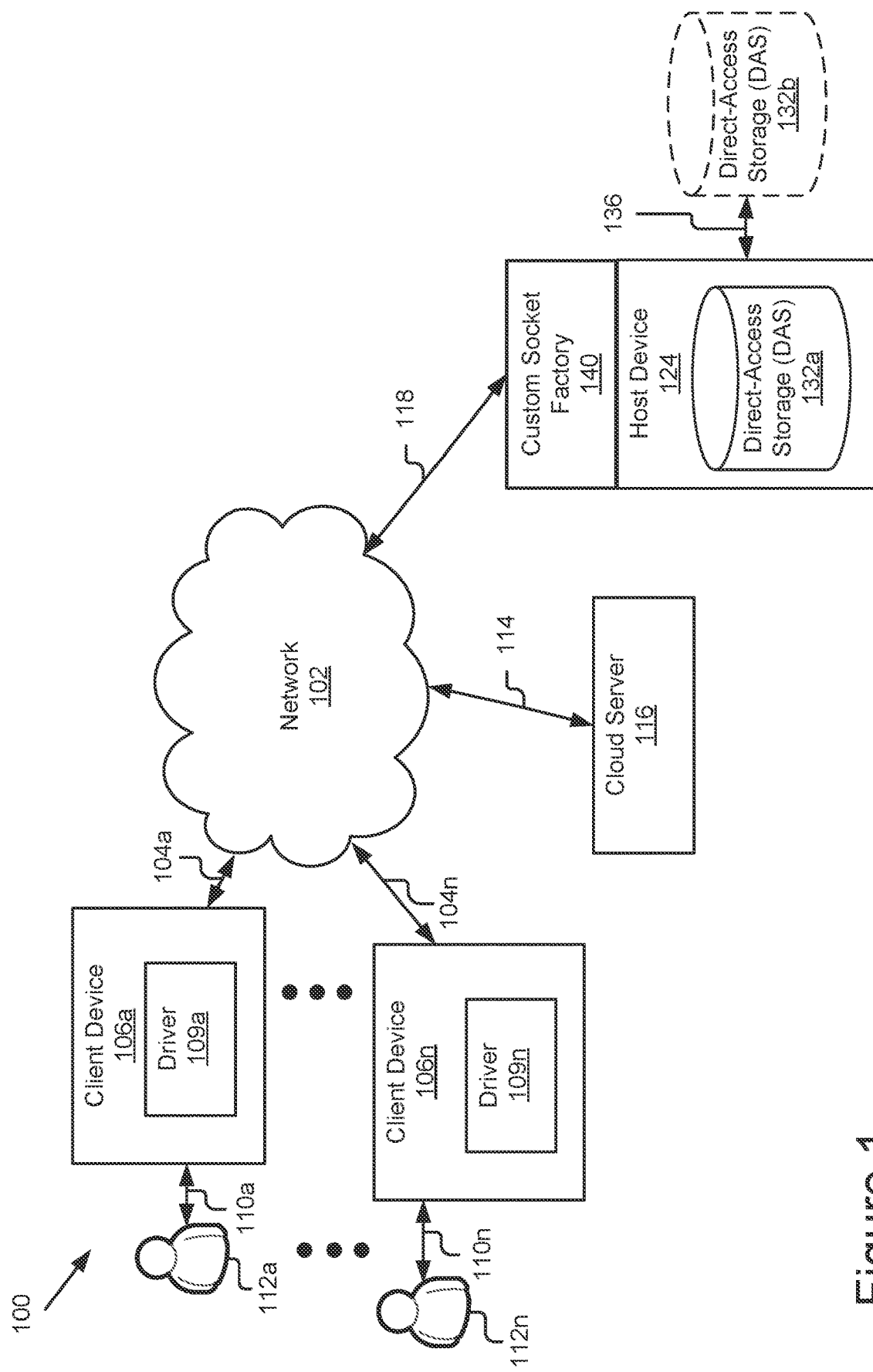
FIG. 1 is a block diagram illustrating an example system for data access and firewall tunneling using a custom socket factory according to one embodiment.

FIG. 1 is a block diagram illustrating an example system 100 for data access using a custom socket according to one embodiment. The illustrated system 100 includes client devices 106a . . . 106n, a cloud server 116, and a custom socket 140 coupled to a host device 124, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by lines 110a . . . 110n. The cloud server 116 may be coupled to the network 102 via signal line 114. The host device 124 may be coupled, using the custom socket factory 140, to the network 102 via signal line 118. The use of the nomenclature "a" and "n" in the reference numbers indicates that any number of those elements having that nomenclature may be included in the system 100.

In some implementations, a computer operating system supports the concept of client and server sockets. Client sockets may be used to make outgoing connections to server sockets. In some implementations, default server sockets may be used to create a listener socket on the server that allows connections from an incoming client socket to be established. A client/server socket connection represents a network communication between an IP address and port number on a client and the IP address and port number on the server. The custom socket factory 140 replaces the default listener socket on the host device 124 and does not require a listener socket to make connections to client sockets on the client device 106 as described herein.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.).

The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 109a . . . 109n of a driver 109 (also referred to individually and collectively as driver 109). The driver 109 may be storable in a memory and executable by a processor of a client device 106. In some embodiments, the client device 106 may also include applications for making phone calls, video calls, messaging, social networking, gaming, capturing digital video, and/or images, authoring documents, etc.

The host device 124 is a computing device having data processing and communication capabilities. While FIG. 1 illustrates one host device 124, the present specification applies to any system architecture having one or more host devices 124. In some embodiments, a host device 124 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The host device 124 may couple to and communicate with other entities of the system 100 via the network 102 using a wireless and/or wired connection.

Examples of a host device 124 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one host device 124 is depicted in FIG. 1, the system 100 may include any number of host devices 124. In addition, a plurality of host devices 124 may be of the same or different types of computing devices. In the depicted implementation, the host device 124 includes or is coupled to a Direct Access Storage 132a or 132b, respectively. In one embodiment, the host device 124 is connected to DAS 132b via signal line 136. In one embodiment, on-premises data is stored by a DAS 132a/132b. In some embodiments, the host device 124 may also include applications for making phone calls, video calls, messaging, social networking, gaming, capturing digital video, and/or images, authoring documents, etc.

The custom socket factory 140 may be configured to accept client connections. The custom socket factory 140 implements functionality to replace the default behavior of a listener socket with new behavior, while still adhering to the original interface similar to a default socket factory exposed by the listener socket that the custom socket factory 140 replaces. In some implementations, the custom socket factory 140 may connect sockets of the host device 124 to outside sources (such as the cloud server 116, client device 106, etc.) for communication therewith. The custom socket factory 140 may include software and/or hardware configured to manage sockets of the host device 124 and provide connections to sockets of other devices. Sockets may include internet sockets in the internet protocol (IP) network and the sockets may be associated with socket addresses representative of IP addresses and/or port numbers of local and/or remote nodes.

In one embodiment, the custom socket factory 140 lacks a listening socket altogether which is different than a default socket factory. In an alternative embodiment, the custom socket factory 140 includes a listener socket but connects to the cloud server 116 using alternative connections described below. In some implementations, the custom socket factory 140 makes an initial connection with the cloud server 116 and then waits for a connection to be requested. The custom socket factory 140 may perform a long poll or a receive a push notification to identify whether a connection is requested from the cloud server 140, rather than actively listening like the default socket factory. The custom socket factory 140 may implement an accept method to return a client socket connection to the host device 124. The custom socket factory 140 may be configured to receive connection information related to a client device 106 from the cloud server 116 in response to a connection being requested.

In some implementations, the custom socket factory 140 appears to the server software (such as the host device 124, cloud server 116, and/or client device 106) as a default connector by providing the same interface as a default server socket factory. In some implementations, the custom socket factory 140 will return a server socket with the same interface as a server socket returned by the default server socket factory. By providing the same interface as the default server socket factory, the server software does not need to be updated and the custom socket factory 140 can be incorporated into a system without updating the server software. In some implementations, the custom socket factory 140 eliminates the requirement for intermediate software to copy data between socket connections by providing a direct connection to a client device 106.

The cloud server 116 may include one or more computing devices having data processing, storing, and communication capabilities. For example, the cloud server 116 may include one or more hardware servers, server arrays, storage devices, systems, etc., and/or may be centralized or distributed/cloud-based. In some implementations, the cloud server 116 may include one or more virtual servers, which operate in a host server environment and access the physical hardware of the host server including, for example, a processor, memory, storage, network interfaces, etc., via an abstraction layer (e.g., a virtual machine manager). In one embodiment, the cloud server 116 stores and accesses client data, which may be used to interface with the custom socket factory 140 to match a connection the cloud server 116 has with a client device 106 requesting data access from a host device 124 with a connection that the cloud server 116 has with that host device 124 using the custom socket factory 140. Although, the cloud server 116 is named "cloud," for the purposes of the cloud server 116 the use of the term "cloud" is merely a naming convention. In some implementations, the cloud server 116 may be located on the same premises as, for example, the host device 124. In some implementations, the cloud server 116 maybe located at a remote location from, for example, the host device 124.

It should be understood that the system 100 illustrated in FIG. 1 is representative of an example system for data access using a custom socket factory 140 according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into a single computing device or system or additional computing devices or systems, etc.

In one embodiment, a computing device, whether a client device 106, a cloud server 116, or a host device 124, may include a processor (not shown), a memory (not shown), a communication unit (not shown), which may be communicatively coupled by a communications bus (not shown). However, it should be understood that a computing device may take other forms and include additional or fewer components without departing from the scope of the present disclosure. For example, a computing device may include input and output devices (e.g., a display, a keyboard, a mouse, touch screen, speakers, etc.), various operating systems, sensors and other physical configurations.

The processor may execute code, routines and software instructions by performing various input/output, logical, and/or mathematical operations. The processor may have various computing architectures to process data signals including, for example, a complex instruction set computer (CISC) architecture, a reduced instruction set computer (RISC) architecture, and/or an architecture implementing a combination of instruction sets. The processor may be physical and/or virtual, and may include a single core or plurality of processing units and/or cores. In some implementations, the processor may be capable of generating and providing electronic display signals to a display device (not shown), supporting the display of images, capturing and transmitting images, performing complex tasks including various types of feature extraction and sampling, etc. In some implementations, the processor may be coupled to the memory of the computing device via the bus to access data and instructions therefrom and store data therein. The bus may couple the processor to the other components of the computing device including, for example, the memory and communication unit.

The memory may store and provide access to data to the other components of the computing device. In some implementations, the memory may store instructions and/or data that may be executed by the processor. For example, the memory of the client device 106 may store the driver 109. The memory is also capable of storing other instructions and data, including, for example, an operating system, hardware drivers, other software applications, databases, etc. The memory may be coupled to the bus for communication with the processor and the other components of the computing device. In one embodiment, the memory of the computing device stores the code and routines that, when executed by the computing device's processor, perform the functions of that computing device as described herein. For example, the functionality described below with reference to host device 124 may be performed when code and routines stored on the host device 124 are executed by the processor of the host device 124.

The memory includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor. In some implementations, the memory may include one or more of volatile memory and non-volatile memory. For example, the memory may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray', etc.). It should be understood that the memory may be a single device or may include multiple types of devices and configurations.

The bus can include a communication bus for transferring data between components of a computing device or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit may include one or more interface devices (I/F) for wired and/or wireless connectivity with the network 102. For instance, the communication unit may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit can link the processor to the network 102, which may in turn be coupled to other processing systems. The communication unit can provide other connections to the network 102 and to other entities of the system 100 using various standard network communication protocols, including, for example, those discussed elsewhere herein.

As mentioned above, a computing device may include other and/or fewer components. Examples of other components may include a display, an input device, a sensor, etc. (not shown). In one embodiment, the computing device includes a display. The display may display electronic images and data output by the computing device for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 2:
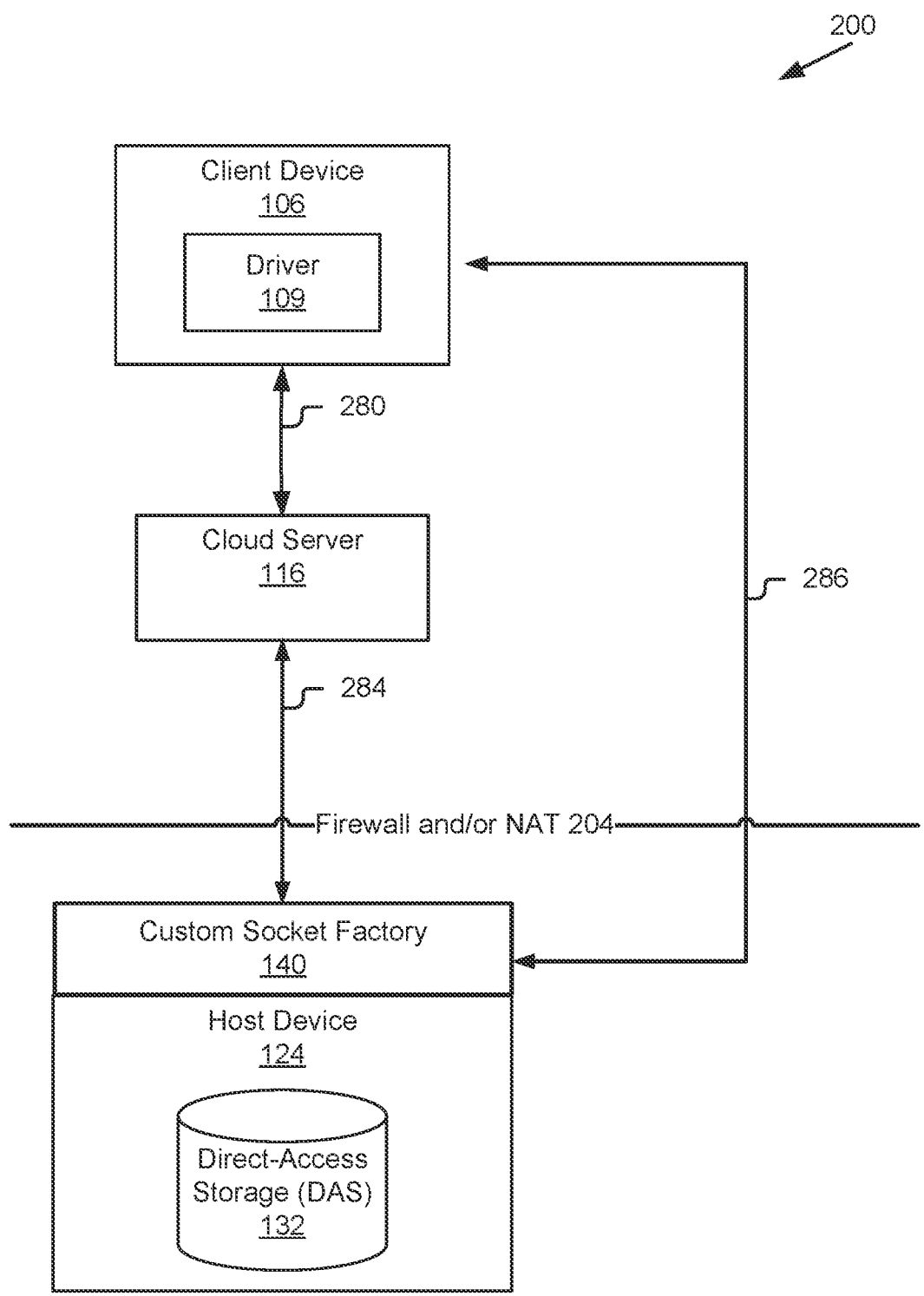
FIG. 2 is a block diagram illustrating an example system for data access and firewall tunneling using a custom socket factory according to one embodiment.

FIG. 2 is a block diagram illustrating an example system for data access and firewall tunneling using a custom socket factory 140 according to one embodiment. In the illustrated embodiment, the custom socket factory 140 and the host device 124 are behind a network separation device (e.g., firewall and/or network address translator (NAT), referred to herein as a firewall and/or NAT) as indicated by line 204. Because the host device 124 is behind a firewall and/or NAT, the client device 106 may not directly access and communicate with the host device 124, because, for example, the firewall may prohibit the client device 106 (which may be behind its own firewall and/or NAT (not shown)) from being aware of the host device's 124 existence behind the firewall and/or the NAT's address translation does not allow for a connection to a "known" port.

In one embodiment, this issue of the client device 106 not being able to directly initiate access or communication with the host device 124 is overcome using the custom socket factory 140 as described below.

As illustrated, the client device 106 may communicatively couple to the cloud server 116 as illustrated by signal line 280; the host device 124 may communicatively couple to the cloud server 116 using the custom socket factory 140 as illustrated by signal line 284; and the host device 124 may communicatively couple to the client device 106 using the custom socket factory 140 as illustrated by signal line 286.

In one embodiment, the connections 280, 284, and 286 are each established over the network 102 (e.g., including the Internet) and used as described below with reference to FIGS. 2-4 and the methods therein. For example, referring to FIG. 2, in one embodiment, the connection 284 between the host device 124 and the cloud server 116 is established by the custom socket factory 140 connecting to the cloud server 116 and then waiting for a connection with a client device 106 to be requested. In another example, still referring to FIG. 2, the connection 286 between the host device 124 and the client device 106 is established by the custom socket factory 140 receiving connection information including a host address from the cloud server 116 and connecting directly to the client device 106 using the host address. In some implementations, the connection information may include a host address and/or host port number along with any additional information that might be required for making a connection to a client device 106, including but not limited to load balancer routing information.

It should be recognized that the methods described herein are merely examples and that other examples and embodiments exist. It should further be understood that the system 200 illustrated in FIG. 2 is representative of an example system for data access behind a network separation device using a custom socket factory 140 according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems, etc.

Example Methods

Figure 3:
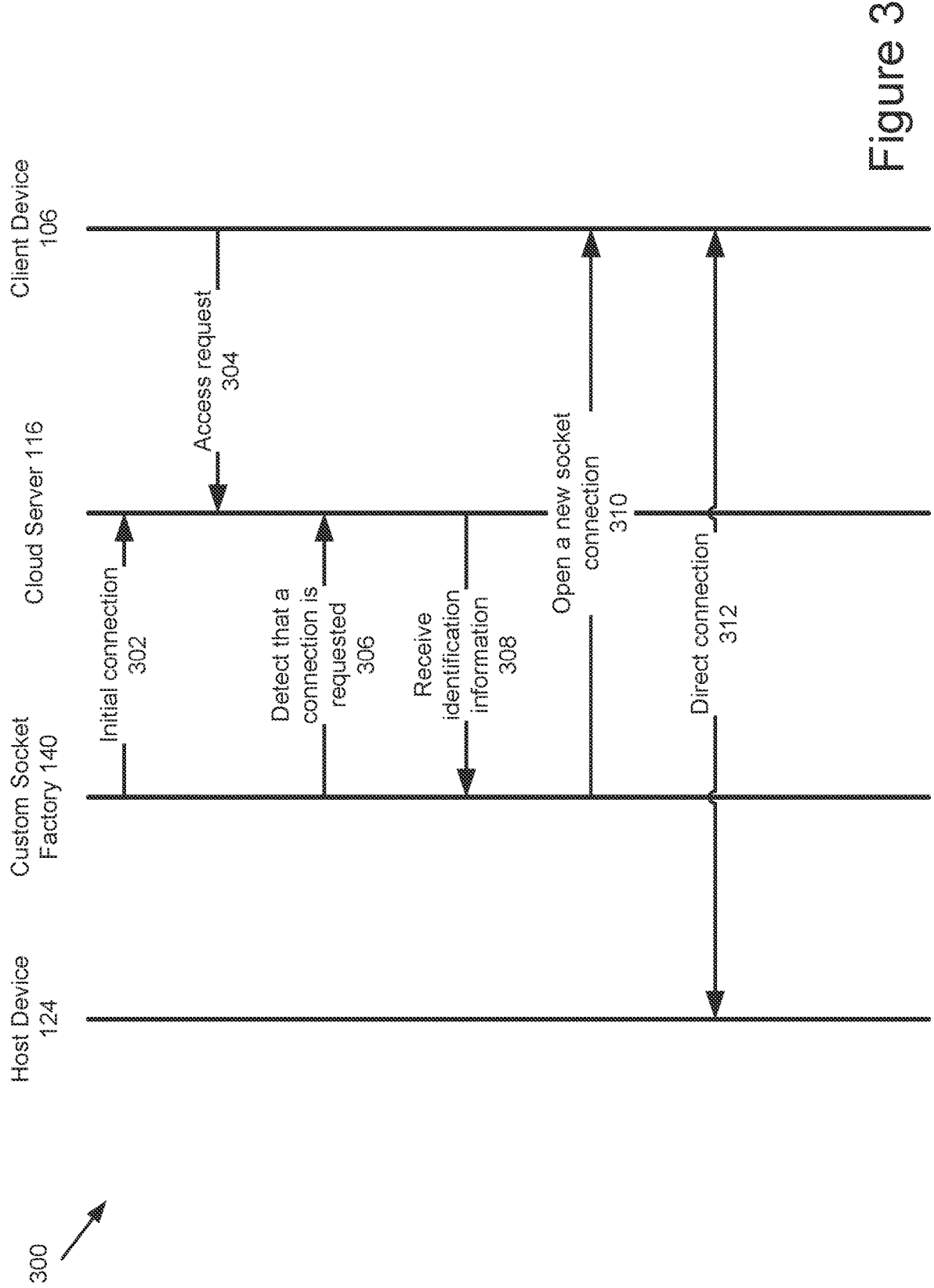
FIG. 3 is a flowchart of an example method for data access and firewall tunneling using a custom socket factory according to one embodiment.
Figure 4:
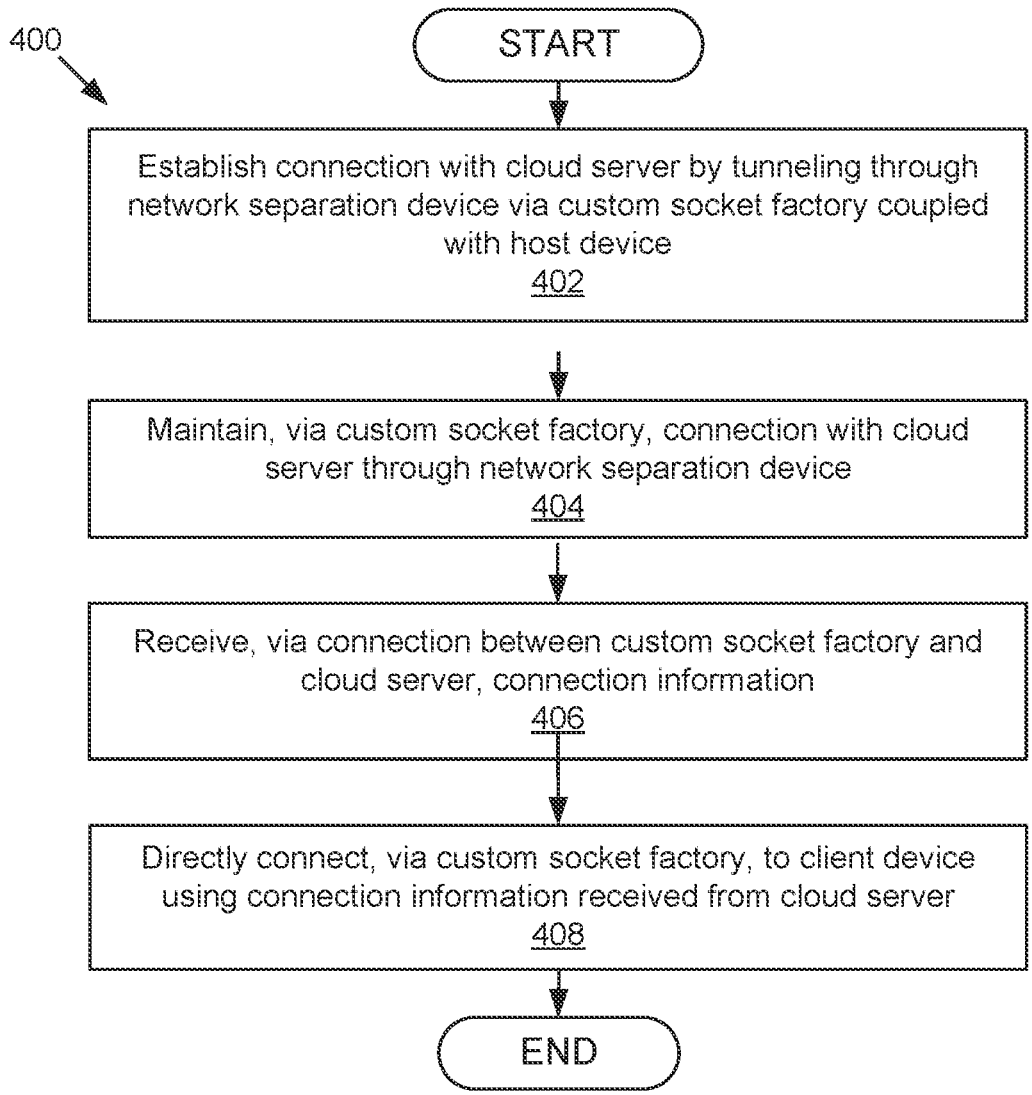
FIG. 4 is a flowchart of an example method for data access and firewall tunneling using a custom socket factory according to one embodiment.

FIGS. 3 and 4 depict methods 300 and 400 performed by the system described above in reference to FIGS. 1-2. However, it should be recognized that other or additional protocols and message services may be used without departing from the teachings herein.

Referring to FIG. 3 an example method 300 for data access and firewall tunneling using a custom socket factory according to on embodiment is shown. In the illustrated embodiment, the host device 124 includes the custom socket factory 140 and both are located behind the firewall and/or NAT that may not be open to outside network connections. In the illustrated embodiment, the custom socket factory 140 initializes a connection 302 through the firewall and/or NAT to the cloud server 116. The custom socket factory 140 then waits for a connection (e.g. with a client device 106) to be requested. In some implementations, the custom socket factory 140 may perform long polling to detect whether a connection is requested from the cloud server 116. The custom socket factory 140 does not use a listener port in a listening state that waits for an initiative from the cloud server 116, since the network separation device would prevent any such initiative. Rather, the custom socket factory is customized to reach out to the cloud server 116, e.g., using the long polling and/or a push to determine if the connection is requested.

In the illustrated embodiment, the client device 106, operating independently of the host device 124 and/or the custom socket factory 140, may send an access request 304 requesting a connection to the host device 124. The requested connection may be received by the cloud server 116 with the cloud server 116 acting as an intermediary that can receive access requests 304 from one or more client devices 106 over the network 102. The cloud server 116 may be accessible to the client device 106 over the network 102 and, in the illustrated embodiment, is not located behind a firewall and/or NAT.

The client device 106 may request the connection responsive to an application and/or program operating on the client device 106 requesting access to data on the host device 124. In some implementations, the client device 106 may send connection information including identification information such as socket information, IP addresses (e.g. of the client device 106), and/or additional information for connecting to the client device 106 along with an access request 304 to the cloud server 116. For example, in one embodiment, the access request is an HTTP request and includes a host ID associated with a host device 124. In one embodiment, the host ID is globally unique identifier (GUID) associated with the host device 124. In some embodiments, the host ID is used in order to route the access request 304 to the appropriate host device 124 when multiple host devices (not shown) are located behind one or more network separation devices and communicate with the cloud server 116. In some embodiments, this identification information for connecting to the client device 106 may be stored at the cloud server 116.

In some implementations, the cloud server 116 sends the connection information to the custom socket factory 140. The connection information is used by the custom socket factory 140 to connect to the client device 106. The connection information may include the client address and client port number along with any additional information used to make the connection to the client device 106, such as load balancer routing information should the client device 106 be located behind a load balancer or application gateway. In some implementations, the custom socket factory 140 receives the connection information through the existing connection to the cloud server 116 responsive to the long poll or as a push notification.

In some implementations, the cloud server 116 may be hosting connections to multiple host device 124 instances and each instance would provide its GUID to the cloud server. The client device 106 specifies a GUID when it requires a connection to specify the desired host device 124 instance.

It will be recognized that because of the NAT and/or firewall, the cloud server 116 may not be able to initiate communication with the host device 124. However, since the host device 124 initiates the initial connection with the cloud server 116 via the custom socket factory 140, a hole is "punched" through the network separation device a.k.a. the firewall and/or NAT 204 and the host device 124 and cloud server 116 is able to provide identification information to the custom socket factory 140 after the custom socket factory 140 has reached out.

Subsequent to receiving the access request 304, the cloud server 116 signals to the custom socket factory 140 that a connection is requested. In some implementations, the cloud server 116 signals that a connection is requested responsive to a long poll or through a push notification to the custom socket factory 140. The custom socket factory 140 may detect 306 this signal in response to the long polling or push notification performed by the custom socket factory 140. In some implementations, the push implementation can use the initial connection 302. In this scenario, the initial connection 302 establishes a persistent connection between the custom socket factory 140 and the cloud server 116 that may be used by the cloud server 116 to send the push connection notification to the custom socket factory 140.

In some implementations, the custom socket factory 140 may then connect through the firewall and/or NAT to the cloud server 116 and receive the identification information 308 from the cloud server 116 that allows the custom socket factory 140 to connect to the client device 106. In further implementations, when the cloud server 116 signals to the custom socket factory 140 that a connection is requested, all connection information that is required to make the connection is included in the signal. When the long polling approach is used, the long polling response would include the connection information. When the push notification approach is used, the push notification to the custom socket factory 140 would include the connection information.

The custom socket factory 140 uses the identification information received from the cloud device 116 to open a new socket connection 310 to the client device 106. In some implementations, the custom socket factory 140 may use an accept method to return a client socket connection to the server software of the host device 124. In some implementations, an accept method provides a way for the custom socket factory 140 on the server to pass the client/server connection that has been established between the custom socket factory 140 and the client socket to the host software (e.g. located at the host device 124) that is responsible for responding to requests from the client device 106.

The custom socket factory 140 may then return the new socket connection 310 to the server software of the host device 124 as part of the accept method. The host device 124 uses the new socket connection 310 to directly connect 312 to the client device 106. At this point, the custom socket factory 140 hands the connection to the host device 124 and the host device 124 directly connects 312 to the client device 106. By using the custom socket factory 140, the host device 124 and the client device 106 may directly connect to each other to access information rather than sending information through an intermediary (such as the cloud server 116) that would have to copy data received from a first socket connection of the host device 124 and then resend the copied information to a second socket connection of the client device 106.

The custom socket factory 140 provides for a quicker and more efficient use of resources, reduces errors that may be introduced when sending information through an intermediary, and reduces hardware and/or software requirements that are necessary in other implementations where an additional server keeps a connection open through the firewall and/or NAT to the host device 124 while a first server receives connection information from the client device 106. The custom socket factory 140 also removes a single point of failure that exists in other systems should the intermediary software fail because of resource limitations and/or bugs in the intermediary software. By removing a point of failure that exist in other systems, the custom socket factory 140 becomes more dependable and less likely to fail than the other systems.

Referring to FIG. 4 an example method 400 for data access and firewall tunneling using a custom socket factory according to one embodiment is shown. At block 402, the custom socket factory 140 establishes a connection with the cloud server 116 by tunneling through the firewall and/or NAT 204. The custom socket factory 140 may be part of and/or coupled to the host device 124 and located behind the firewall and/or NAT 204. In some implementations, the firewall and/or NAT 204 may block incoming connections to the host device 124.

At block 404, the custom socket factory 140 maintains the connection with the cloud server 116 through the firewall and/or NAT 204. In some implementations, the custom socket factory 140 maintains the connection by long polling the cloud server 116 to determine if a connection to a client device 106 is requested. In some implementations, the custom socket factory 140 will continue to long poll and/or reach out to the cloud server 116 until a connection to a client device 106 is requested. In further implementations, the custom socket factory 140 may include a time-out function if a connection to a client device 106 is not requested within a threshold time period. In further implementations, if the time-out period occurs, the custom socket factory 140 may be configured to reestablish a connection with the cloud server 116 and the time-out period is reset. In some implementations, the long polling includes a periodic timeout (that in some instances are normally 30 seconds apart, although other time periods are also contemplated) to prevent the network gateways from detecting a connection that was idle too long and returning a gateway timeout that disconnects the socket. A long polling timeout is an example of a server timeout response to the long poll, after which another long poll may be started by the client without a socket disconnection.

In some implementations, the cloud server 116 may operate outside of the firewall and/or NAT 204 and may communicate with one or more client devices 106. When a client device 106 requires a connection to the host device 124, the client device 106 may request access to the host device 124 by communicating with the cloud server 116. Responsive to the client device 106 requesting access, the cloud server 116 may provide a signal to the custom socket factory 140 that a connection is requested. In some implementations, the signal from the cloud server 116 may be detectable during a long poll by the custom socket factory 140.

At 406, the custom socket factory 140 receives via the connection with the cloud server 116, connection information associated with the client device 106. In some implementations, the custom socket factory 140 receives the connection information responsive to detecting the signal from the cloud server 116 that a connection is requested. In some implementations, the custom socket factory 140 reaches out to the cloud server 116 to receive the connection information. The connection information may include socket information, client address and/or client port number information, IP address information, and/or other connection information for the custom socket factory 140 to connect to the client device 106, such as load balancer routing information should the client device 106 by located behind a load balancer or application gateway.

At 408, the custom socket factory 140 directly connects to the client device 106 using the connection information received from the cloud server 116. In some implementations, the direct connection between the host device 124 and the client device 106 allows for the two devices to connect without requiring an intermediate server to copy and resend requests and information. The client device 106 may then query and the host device 124 may then provide responses directly to each other. In some implementations, the custom socket factory 140 implements an accept method, described elsewhere herein, to return a client socket connection to the host device 124.

In some implementations, the custom socket factory 140 improves the security of the system, by not leaving an open port and only connecting directly to client devices 106 that meet specific parameters. For instance, the cloud server 116 can review the identification information and only signal to the custom server socket 140 that a connection is requested if the client device 106 meets the requirements for connecting to the host device 124, such as access keys, login information, correct applications running, etc. In an example implementation, the client device may supply a user ID and/or password that is known (e.g., stored in a database accessible by the cloud server 116) to the cloud server 116 along with suppling the GUID of a host device 124 when a connection is requested. The cloud server 116 may maintain a list of users that are permitted to make connections to host devices 124 with specific GUIDs and the cloud server 116 uses the login credentials and GUID to validate whether a connection is permitted. In some implementations, if a client device 106 attempts to connect to a host device 124 that the client device 116 is not authorized to connect to, the cloud server 116 will return an access denied error to client device 106.

In some implementations, the custom socket factory 140 can replace the socket factory in existing connectors, rather implementing and installing entirely new connectors. In one example, the Java programming language can be used to create a new socket factory class in the software and specifying the location of the new socket factory class in the Java class path before the location of the default socket factory classes. By using this software solution to replace the socket factories in existing connectors, the custom socket factory 140 can be implemented in currently existing software at a low cost while providing greater security and eliminating software and hardware assets that were previously used to access data behind the firewall.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    receiving, at an intermediary, a request from a client device requesting access to a host device, the host device coupled to a custom socket factory that established a first connection between the custom socket factory and the intermediary through a network separation device, the intermediary and the client device on a first side of the network separation device and the host device on a second side of the network separation device;
    obtaining, by the intermediary, connection information of the client device; and
    transmitting, from the intermediary to the custom socket factory via the first connection, the connection information of the client device, wherein the custom socket factory establishes a second connection between the custom socket factory and the client device via a network and through the network separation device using the connection information of the client device.

2. The method of claim 1, wherein:
    the host device is behind the network separation device;
    the intermediary and the client device are outside of the network separation device; and
    the network separation device is one of a firewall and a network address translator.

3. The method of claim 1, wherein the custom socket factory establishes the second connection between the custom socket factory to the client device by:
    opening a new socket connection to the client device using the connection information of the client device; and
    returning the new socket connection to the host device that is responsible for responding to a client request from the client device.

4. The method of claim 1, wherein:
    the custom socket factory lacks a listener port; and
    the custom socket factory appears as a default socket factory of the host device.

5. The method of claim 1, wherein the custom socket factory maintains the first connection between the custom socket factory and the intermediary by:
    determining that a connection to the host device is not requested during a timeout period associated with the first connection between the custom socket factory and the intermediary;
    re-establishing the first connection between the custom socket factory and the intermediary; and
    resetting the timeout period.

6. The method of claim 1, wherein the custom socket factory maintains the first connection between the custom socket factory and the intermediary by:
    performing a long poll action with the intermediary, the long poll action associated with a long poll timeout;
    determining that a long poll timeout occurs; and
    starting another long poll action with the intermediary without a socket disconnection.

7. The method of claim 1, further comprising:

receiving, at the intermediary from the client device, credential information of the client device and a host identifier of the host device;

determining, by the intermediary, that the client device is permitted to connect to the host device based on the credential information of the client device and the host identifier of the host device; and responsive to determining that the client device is permitted to connect to the host device, transmitting, from the intermediary to the custom socket factory via the first connection, a signal indicating that a connection to the host device is requested.

8. The method of claim 1, wherein transmitting the connection information of the client device from the intermediary to the custom socket factory includes:

transmitting the connection information of the client device from the intermediary to the custom socket factory in response to a long poll action or a push action performed by the custom socket factory.

9. The method of claim 1, wherein obtaining the connection information of the client device includes:

receiving, from the client device, the connection information of the client device including one or more of socket information, address information, a port number, and routing information associated with the client device.

10. The method of claim 1, wherein:

the connection information of the client device is stored at the intermediary; and obtaining the connection information of the client device includes retrieving the connection information of the client device from the intermediary.

11. An intermediary comprising:

one or more processors; and a memory storing instructions that, when executed by the one or more processors, cause the intermediary to:

receive a request from a client device requesting access to a host device, the host device coupled to a custom socket factory that established a first connection between the custom socket factory and the intermediary through a network separation device, the intermediary and the client device on a first side of the network separation device and the host device on a second side of the network separation device;

obtain connection information of the client device; and transmit, to the custom socket factory via the first connection, the connection information of the client device, wherein the custom socket factory establishes a second connection between the custom socket factory and the client device via a network and through the network separation device using the connection information of the client device.

12. The intermediary of claim 11, wherein:

the host device is behind the network separation device;

the intermediary and the client device are outside of the network separation device; and the network separation device is one of a firewall and a network address translator.

13. The intermediary of claim 11, wherein the custom socket factory establishes the second connection between the custom socket factory and the client device by:

opening a new socket connection to the client device using the connection information of the client device; and returning the new socket connection to the host device that is responsible for responding to a client request from the client device.

14. The intermediary of claim 11, wherein:

the custom socket factory lacks a listener port; and the custom socket factory appears as a default socket factory of the host device.

15. The intermediary of claim 11, wherein the custom socket factory maintains the first connection between the custom socket factory and the intermediary by:

determining that a connection to the host device is not requested during a timeout period associated with the first connection between the custom socket factory and the intermediary;

re-establishing the first connection between the custom socket factory and the intermediary; and resetting the timeout period.

16. The intermediary of claim 11, wherein the custom socket factory maintains the first connection between the custom socket factory and the intermediary by:

performing a long poll action with the intermediary, the long poll action associated with a long poll timeout;

determining that a long poll timeout occurs; and starting another long poll action with the intermediary without a socket disconnection.

17. The intermediary of claim 11, wherein the instructions, when executed by the one or more processors cause the one or more processors to:

receive, from the client device, credential information of the client device and a host identifier of the host device;

determine that the client device is permitted to connect to the host device based on the credential information of the client device and the host identifier of the host device; and responsive to determining that the client device is permitted to connect to the host device, transmitting, to the custom socket factory via the first connection, a signal indicating that a connection to the host device is requested.

18. The intermediary of claim 11, wherein transmitting the connection information of the client device from the intermediary to the custom socket factory includes:

transmitting the connection information of the client device from the intermediary to the custom socket factory in response to a long poll action or a push action performed by the custom socket factory.

19. The intermediary of claim 11, wherein obtaining the connection information of the client device includes:

receiving, from the client device, the connection information of the client device including one or more of socket information, address information, a port number, and routing information associated with the client device.

20. The intermediary of claim 11, wherein:

the connection information of the client device is stored at the intermediary; and obtaining the connection information of the client device includes retrieving the connection information of the client device from the intermediary.

* * * * *